May 30, 1961 — A. C. FLORES — 2,986,103
MACHINES FOR MAKING AND BAKING CORN TORTILLAS
Filed Sept. 29, 1958 — 2 Sheets-Sheet 1

INVENTOR.
Alberto Castro Flores
BY Michael S. Striker
Attorney

May 30, 1961 A. C. FLORES 2,986,103
MACHINES FOR MAKING AND BAKING CORN TORTILLAS
Filed Sept. 29, 1958 2 Sheets-Sheet 2
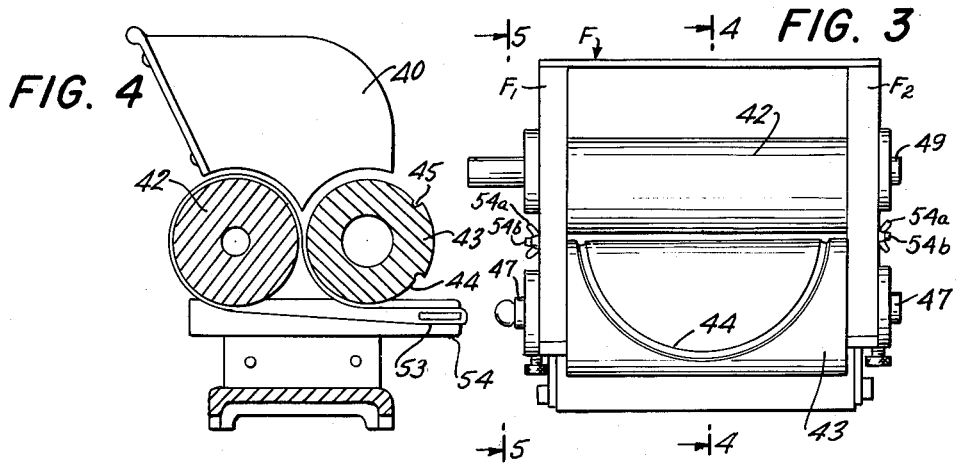
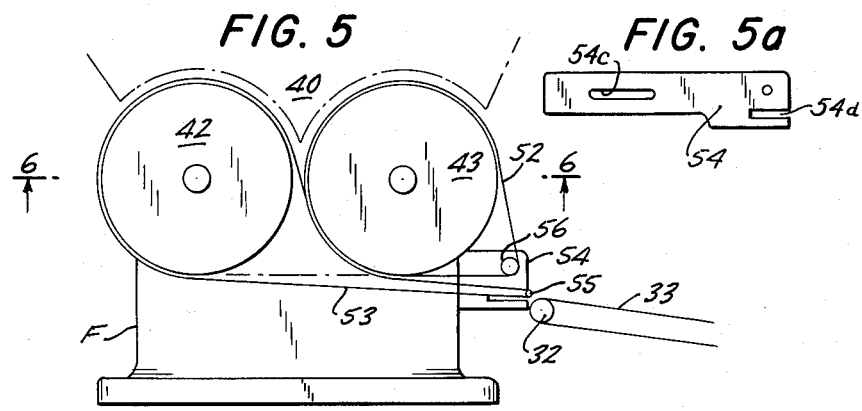
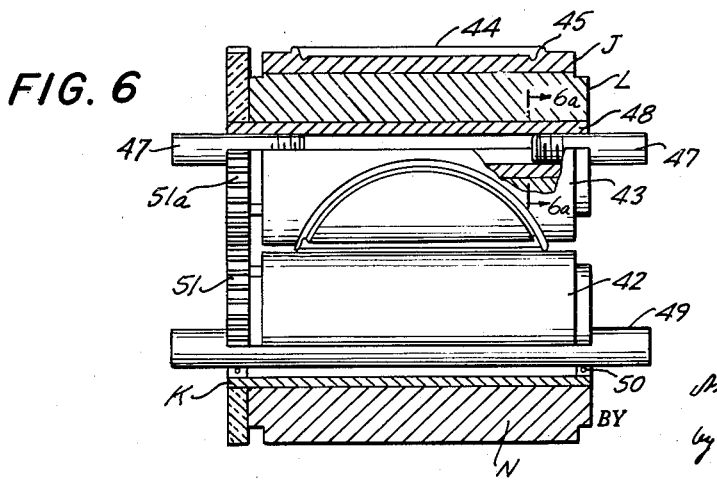
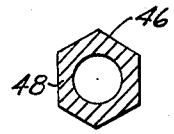
INVENTOR.
Alberto Castro
Flores
BY Michael S. Striker
Attorney

UNITED STATES PATENT OFFICE 2,986,103
Patented May 30, 1961

2,986,103

MACHINES FOR MAKING AND BAKING CORN TORTILLAS

Alberto Castro Flores, Matamoros Pte. 430, Monterrey, Nuevo Leon, Mexico

Filed Sept. 29, 1958, Ser. No. 764,130

Claims priority, application Mexico July 17, 1958

16 Claims. (Cl. 107—60)

This invention relates to a machine for making and baking corn tortillas or the like in a continuous sequence.

In this machine, dough blanks formed into tortilla shape are conveyed sequentially to a first heated endless baking surface moving in a continuous path partially baking the tortillas at one side and then transferring them inverted onto a second heated baking surface also moving in a continuous endless path whence they are sequentially removed after the finished baking period.

A machine embodying the foregoing concept of this invention comprises a baking drum presenting a cylindrical baking surface rotated about a horizontal axis, upon which the shaped dough blanks are sequentially deposited at the top for baking at one side whereby they may adhere to the baking surface during the further rotation of the drum. A horizontal circular baking pan is mounted directly underneath the horizontal baking drum for rotation about a vertical axis arranged to intersect with the horizontal axis of the baking drum. Stripping means are provided for detaching the partially baked tortillas from the under side of the baking drum and thereby to deposit them inverted upon the baking pan below in order that the tortillas may then be baked on the opposite side. Both the baking drum and the baking pan are driven and rotated at appropriate speeds in synchronism with each other so they will cooperate in producing the finished baked tortillas of the desired quality. Preferably, provision is made to have the finished tortillas discharged continuously at the margin of the pan to an end receiving station.

A dough machine may be associated with the baking drum, for sequentially producing the tortilla shaped blanks of dough, preferably with a suitable endless conveyer means transferring the tortilla blanks from the dough machine onto the baking drum.

According to one feature, the rotary horizontal baking pan is operatively supported at the periphery for rotation, so that the free space underneath the pan may accommodate suitable heating means. Preferably, fuel burner means are disposed underneath this marginally supported baking pan, with conduit means for the hot combustion gases so arranged as to allow the gases to heat both the horizontal baking pan and the baking drum above.

More specific features lie in the arrangement of simple means for controlling the amount of hot combustion gas to be diverted through the baking drum.

Other features lie in the construction of the rotary baking drum and in its arrangement relative to the stationary gas conduit means.

Other feature lie in the construction of the horizontal baking pan, as well as in the construction of a supporting frame whereby the baking pan is carried for rotation.

Other features lie in the provision of means for further controllably diverting combustion heat for the purpose of additionally heating the tortillas from the top while still on the horizontal baking pan, preferably just prior to their being discharged from the pan.

Still other features lie in the construction and operation of the dough machine for preparing and delivering shaped dough blanks to the baking drum.

Other features and advantages will hereinafter appear.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is an enlarged detail top plan view of the dough machine appearing in Fig. 1, in which a pair of forming rollers cooperate to form the tortilla-shaped blanks of dough, the belts cooperating with these rollers and the feed hopper having been omitted for the sake of clarity;

Fig. 4 is a vertical section taken on line 4—4 of Fig. 3 showing the cross-sectional profile of the forming rollers with the belt of the driven roller omitted;

Fig. 5 is a side view of the dough machine taken on line 5—5 of Fig. 3, showing the forming rollers each cooperating with an endless belt, and the two belts cooperating to deliver the tortilla blanks to a conveyer means leading to the baking drum, a part of the roller frame having been omitted in this illustration for the sake of clarity;

Fig. 5a is a detail view of an adjustable bracket plate for the dough machine; and Fig. 6 is a transverse sectional view taken on line 6—6 in Fig. 5, showing details of construction of the forming rollers with the belts omitted.

Fig. 6a is a detail cross section taken on line 6a—6a of Fig. 6.

Figure 1:
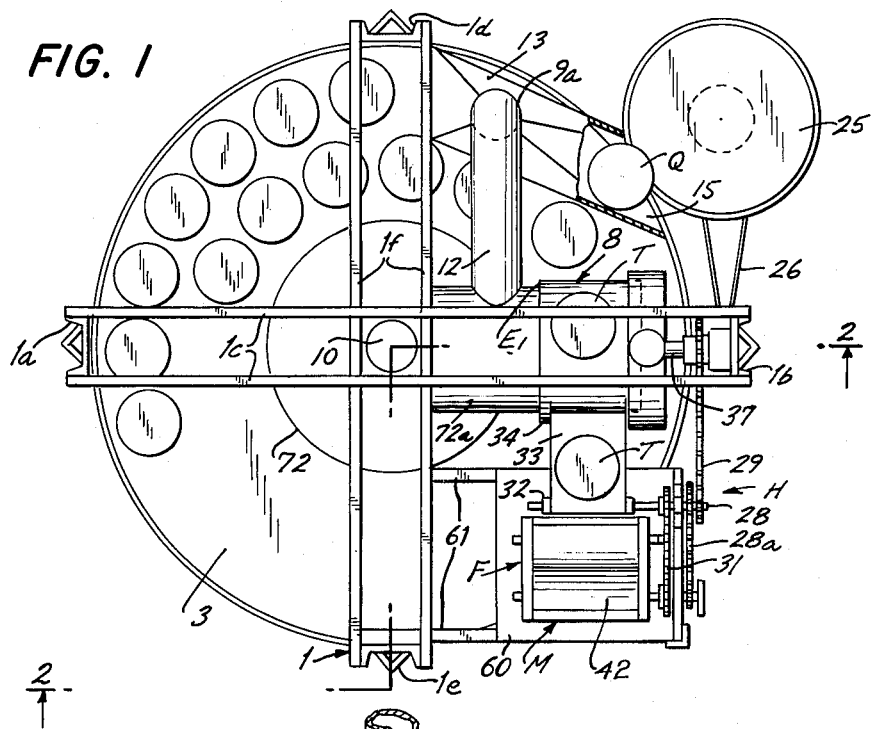
Fig. 1 is a top plan view of the tortilla baking machine, showing the arrangement of the dough machine, the rotary baking drum, and the rotary horizontal baking pan in relation to one another, as well as in relation to the conduit means for the hot combustion gases, and to the tortilla end receiving station.
Figure 2:
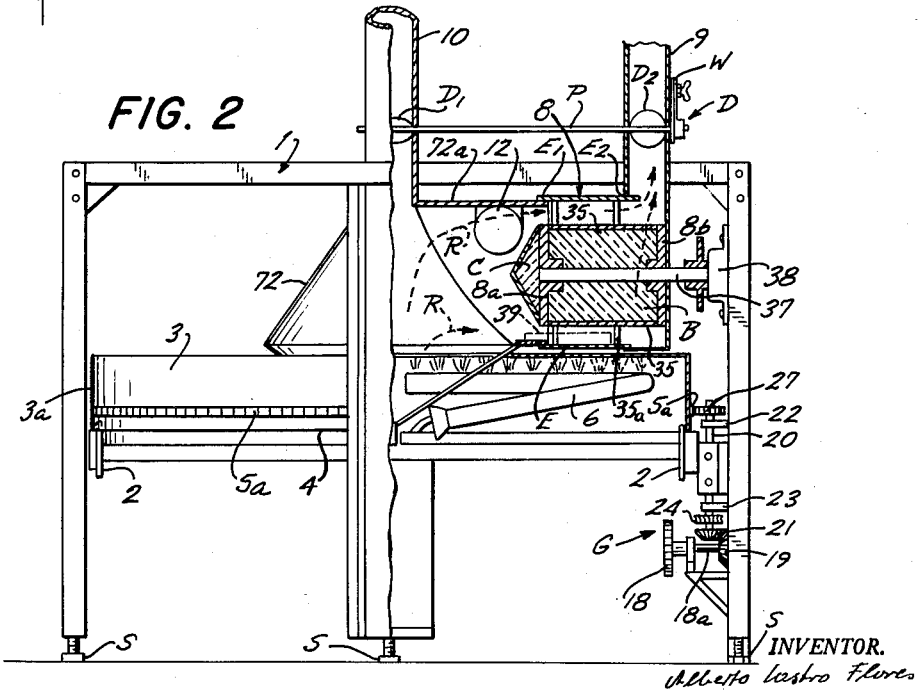
Fig. 2 is a part-sectional vertical elevational view taken on line 2—2 of Fig. 1, showing the arrangement of fuel burner means underneath tre baking pan, and also the conduit means with a control arrangement for proportioning the amount of hot combustion gases passing through the baking drum.

Referring to Figs. 1 and 2, the tortilla baking machine of this invention comprises a cylindrical baking pan or baking drum 8 mounted for rotation about a horizontal axis upon a supporting structure 1. Directly below the baking drum 8 is a horizontal circular baking pan 3 mounted for rotation about a vertical axis upon the supporting structure 1 in such a manner that the axis of drum 8 extends radially of the circular baking pan. While both the drum 8 and the pan 3 rotate, prepared dough blanks T of tortilla shape are deposited sequentially upon the top of the drum for baking at one side and for subsequently depositing the partially baked tortillas inverted from the underside of the drum onto the horizontal baking pan which bakes them from the opposite side while carrying them around for delivery as finish-baked tortillas Q to a receiving station 25 which may be in the form of a revolving basket or disc or plate.

The horizontal pan 3 is supported marginally for rotation upon the structure 1, thus providing space to accommodate suitable heating devices which may be in the form of a fuel burner 6 arranged underneath the pan for heating the same to baking temperature.

The baking pan 3 has a central aperture through which the hot combustion gases from the burner may rise into a stationary conduit here shown to comprise a conical hood 72 continuing into a main stack 10. The hood 72 has a radial branch conduit 72a coaxial with the baking drum 8 for diverting a desired quantity of the hot combustion gases through the drum as indicated by the flow arrows R, and from there into a second or auxiliary stack 9 to waste.

Preferably, a simple damper device D is provided for manually controlling the amount of hot combustion gases to be diverted from the hood 72 and main stack 10 through the baking drum 8 into the second stack 9, this control device comprising a horizontal damper rod P extending through both stacks and carrying fixed thereon damper plates $D_1$ and $D_2$ mounted in the respective stacks although offset with respect to each other in such a manner as to operate in complementary fashion when rotated simultaneously by the damper rod. That is to say, turning of the handle arm W of the damper rod will cause one of the damper plates to close and the other one to open. Thus, the damper rod may be adjusted and positioned for any desired amount of heating gas to be diverted through the baking drum 8, by manipulating the handle arm W on the damper rod.

The radial branch gas conduit 72a has a secondary branch conduit consisting of a horizontal portion 12 and a vertical portion 9a terminating downwardly in a hood 13 arranged to conduct to the finish-baked tortillas a final dose of heat from above just before they discharge by way of a guide 15 or the like from the rotary pan 3 into the rotary receiving basket of the receiving station 25. A suitable control device or damper may be provided in this secondary branch conduit for controlling the amount of hot gas thus to be diverted for radiating its heat upon the tortillas.

In a preferred embodiment of the baking machine as shown in Figures 1 and 2, the horizontal pan 3 is formed with a peripheral depending skirt portion 3a presenting at its bottom edge a peripheral rim or rail 4 resting upon a plurality of supporting rollers 2 mounted upon the supporting structure 1. The supporting structure in one embodiment thereof comprises two pairs of stanchions or posts, namely one pair 1a and 1b opposite to one another rigidly interconnected at the top as by horizontal cross-bracing 1c, and another pair 1d and 1e rigidly interconnected as by horizontal cross-bracing 1f which in turn is rigidly interconnected with the cross-bracing 1c. In this way the structure represents a rigid supporting framework the foot ends of which have levelling screws S for adjusting the structure to the end of properly levelling the machine as a whole as well as the horizontal baking pan. Consequently, the supporting rollers 2 for the baking pan 3 are mounted inwardly upon the respective vertical members of the supporting frame. While the pan may be centered during its rotation by various means, for example by means of additional guide rollers mounted to rotate about their vertical axes while engaging the skirt portion of the pan, the present embodiment provides an arrangement in which the supporting rollers themselves are formed each with a rim for laterally engaging the peripheral bottom edge or rail of the pan in such a manner as to maintain it centered relative to the supporting frame. The depending skirt portion of the baking pan also serves to confine the hot combustion gases, and its outer side is formed with an annulus of teeth 5a for engagement with drive means such as a gear 27 further to be described.

The rotary baking drum 8 comprises a tube E which is formed with an inlet edge portion or inlet and $E_1$ having a substantially sealed relationship with and surrounding the discharge end of the stationary branch conduit 72a, and an outlet end portion $E_2$ having substantially sealed relationship with the foot portion or end casing that carries the auxiliary stack 9, so that with the drum rotating a continuous or uninterrupted flow path is established for the heating gases passing from the hood 72 through the conduit 72a and through the tube E to the auxiliary stack 9.

The baking drum 8 has a hub portion of relatively large diameter in the form of a pair of end plates or discs 8a and 8b interconnected by a cylindrical member 35 which is coaxially received in the tube E and is fixed upon a horizontal shaft 37, the latter mounted or journaled for rotation upon the supporting structure or frame as by means of a bearing 38 carried by one of the vertical members of the supporting frame. Additional bearing means for the shaft 37 may be provided upon this supporting frame, spaced axially inwardly or outwardly from the bearing 38. The tube E is connected with the cylindrical member 35 by radial spacer elevents 35a. The space between the two hub discs 8a and 8b may be filled with a body B of suitable heat insulating material for the protection of the shaft against the heat from the combustion gases passing through the drum. For similar reasons of protection a shield or body C may be provided upon the hub disc 8a facing the oncoming stream of the heating gases.

A dough forming machine M according to the invention may be mounted upon the supporting structure for preparing the dough blanks of tortilla shape and feeding them sequentially to the rotary baking drum. The dough forming machine forms the dough blanks from a mass of dough and, in a preferred arrangement, delivers them to an endless conveyer band 33 which in turn deposits them at the top of the baking drum, that is, onto the revolving tube E. The heat of the baking surface of the tube E while baking the tortillas from one side causes them to adhere to the baking surface until, due to the rotation of the drum, they reach the inverted position at the bottom where they are stripped from the drum as by a suitable stripper device indicated at 39, and thus are deposited in inverted position upon the horizontal pan 3 for finish baking. The stripper device 39, shown in broken lines in Fig. 2, is located rearwardly of and is secured to the branch conduit 72a, for example, by being welded or riveted thereto. The stripper device 39 may assume the shape of an elongated bar whose preferably wedge shaped edge portion extends into close proximity of the periphery of the tube E so that a tortilla T, shown in Fig. 1 atop the baking drum 8, will be separated from the periphery of the revolving tube E after this tube completes about one-half of a full revolution to invert the tortilla prior to separation of the tortilla from the tube E by the stripper device 39.

Although, as shown in Fig. 1, the tortillas from the drum are deposited upon the horizontal pan in an inner annular zone thereof, suitable deflector means or the like may be provided for shifting the tortillas into a surrounding peripheral zone of the pan for passing under the auxiliary hood 13 for final heating from the top just before being delivered from the pan to the receiving station 25. For example, the deflector means may consist of a baffle-like plate or bar which is fixed to a stationary part of the machine, e.g., to the branch conduit 72a or to the supporting structure 1, and extends into close proximity of the upper face of the pan 3 so as to deflect tortillas separated from the tube E by the stripper device 39 towards the periphery of the pan whereby the finish-baked tortillas Q will automatically enter the guide 15 by advancing with the rotary pan 3.

Referring to the detail Figs. 3 to 6, the dough forming machine M to form the blanks of dough comprises a frame F which has a feed hopper 40, shown in Figs. 4 and 5, and in which are mounted for rotation a pair of cooperative forming rollers 42 and 43 geared to each other by gears 51 and 51a carried by the rollers 42 and 43 respectively, the roller 42 being the one that drives the roller 43 through these gears. The surface of roller 42 is of straight cylindrical shape comprising a cylindrical body or jacket N which may consist of suitably compounded rubber, for instance, neoprene or other suitable material. The jacket N in this embodiment is mounted upon a tubular core K rotatable upon an axle 49 by means of ball bearings 50, the axle being mounted in the frame F. The side walls of the hopper 40 are supported on the parallel components $F_1$, $F_2$ of the frame F (see Fig. 3) and, as indicated in phantom lines in Fig. 5, each of these side walls may extend into the gap between the rollers 42, 43 to prevent escape of dough in lateral directions. The frame F is mounted on a base 60 (see Fig. 1) which is fixed to one of the posts 1d by means of brackets 61.

The companion roller 43 comprises a cylindrical body L surrounding a core 48 of hexagonal profile such as is indicated at 46 in Fig. 6a whereby this core is non-rotatably received in a complementary hexagonal bore of the body L. A pair of trunnions 47 are screwed tightly axially into the respective tapped ends of a bore in the hexagonal core, the trunnions 47 supporting the roller 43 for rotation in frame F of the dough machine (see Fig. 3). A jacket J of suitable material tightly surrounds the body L, and is formed with a dough shaping cavity 44 defined by a dough shaping rim 45. The body L as well as the jacket J of roller 43 may consist of a material suited for the present purpose, preferably in the nature of the material of the body N of roller 42. Depending on the sizes of tortillas and on the dimensions of the rollers 42, 43, more than one cavity 44 may be provided in the periphery of the roller 43 if desired.

Referring to Fig. 5, an endless carrier belt 53 engages the driving roller 42 as well as a tensioning rod 55 adjustably mounted upon side brackets 54. This carrier belt preferably consists of rubber or rubber like material and presents a straight belt portion at the bottom leading from the rod 55 tangentially to the roller 42, then hugging a major portion of the roller, passes in S-shaped flexure around the lower portion of the periphery of roller 43 back to and around the tensioning rod 55.

The driven roller 43 is engaged along the major portion of its periphery by a belt 52 running over a tensioning rod 56 also mounted upon the side brackets 54 which in turn are bodily adjustable upon the frame F. The belt 52 also preferably consists of rubber or rubber like material. It will thus be seen that the lower portion of the S-shaped flexure of belt 53 hugs a corresponding portion of belt 52, so that the dough shapes formed by the cooperating rollers are carried between the coacting portions of the two belts so as to pass between the tensioning rods 56 and 55 onto the endless conveyor belt 33 which feeds them to and deposits them upon the top of the baking drum 8 to be subjected to the sequential baking operations above described. The brackets or bracket plates 54 may be mounted upon the frame F so as to be longitudinally slidable in a manner so as to apply a desired operating tension to the belts 52 and 53.

One side bracket 54 is connected to each of frame components $F_1$, $F_2$ and is secured thereto by a wing nut 54a (see Fig. 3). These wing nuts engage the bolts 54b carried by the frame components $F_1$, $F_2$ and extending through elongated slots 54c formed in the brackets 54 (see Fig. 5a). Owing to such mounting of the brackets, the tension rods 55, 56 may be adjusted with respect to the rollers 43, 42 to vary the tension of belts 53, 52, respectively. The notch 54d shown in Fig. 5a serves to receive one end of the rod 55. It is assumed in Fig. 4 that the roller 43 is driven in anticlockwise direction and that the hopper 40 is partially filled with dough so that the dough descends onto the belt 52 above the cavity 44 and deforms the belt 52 to such an extent that the belt is moved into full face-to-face contact with the roller 43 in the latter's cavity and that this cavity is filled up to the shaping rim 45. The exposed side of the batch of dough entering and filling the cavity 44 is flattened by the belt 53 which engages with the rim 45 so that the batch of dough assumes its characteristic shape as indicated at T in Fig. 1. It is to be understood that the belt 52 which always covers the cavity 44 is sufficiently elastic so as to yield to the pressure of dough descending from the hopper 40 and to permit this dough to completely fill the cavity 44. As the belt 52 continues its travel in anticlockwise direction and toward the tensioning rod 56 (See Fig. 5), it moves from the cavity 44 and deposits the raw tortilla T onto the adjacent portion of the belt 53 so that the tortilla may advance over the tensioning rod 55 and onto the upper run of the conveyor 33. The front pulley of the conveyor 33 is shown in Fig. 1 and is identified by the reference numeral 34.

Drive means for moving the various driven components of the machine in synchronism with one another, may comprise any suitable drive arrangement whereby the operations of these components are functionally properly coordinated. Such drive means as herein indicated in Figs. 1 and 2 comprise a drive mechanicm G shown in Fig. 2 to be mounted upon one of the vertical members of the supporting frame. The mechanism G may be driven from a motor imparting torque to a gear 18, which may be transmitted through a pulley 24 to the end receiving station 25, and through gear 27 to the horizontal baking pan 3. That is to say, the master drive gear 18 of this mechanism is mounted on a drive shaft 18a which also carries a bevel gear 19 in driving engagement with a companion bevel gear 21 mounted on a vertical shaft 20 rotating in bearings 22 and 23. The gear 27 is fixed upon the top end portion of shaft 20 and meshes with the teeth 5a on the periphery of the skirt portion 3a of the horizontal baking pan. The drive pulley 24 on shaft 20 drives a V-belt 26 rotating the receiving basket or disc or plate of the receiving station 25.

Another drive mechanism H (see Fig. 1) drives the shaft 37 of the baking drum as through a chain and sprocket drive 29 and its shaft 28 directly drives the conveyer belt 33 by rotating the belt pulley 32 thereof. The shaft 28 in turn may be driven as by a chain and sprocket drive 28a from the same motor that drives the gear mechanism G of Fig. 2. A chain and sprocket drive 31 may drive the roller 42 of the dough machine M from the driven shaft of the belt pulley 32.

Although the common source of driving power or motor for simultaneous driving of the gear 18 of mechanism G and of the chain and sprocket drive 28a of mechanism H has not been particularly shown, it will be understood that with drive means thus centralized all the working components of the machine such as the baking surfaces, the dough machine, and the end receiving station may be driven in synchronism and properly coordinated to one another in regard to function and to operation.

It will be understood that the construction of this baking machine is not limited by the combustion heating system herein shown, inasmuch as, for instance, other fuel systems or electrical heating may be employed.

It will be understood that each of the elements described above, or two or more together, may also find a useful application in other types of baking machines differing from the types described above.

While the invention has been illustrated and described as embodied in a machine for making and baking tortillas, with a rotary cylindrical and a rotary horizontal baking surface, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A tortilla baking machine which comprises, in combination, a baking drum mounted for rotation about a horizontal axis and having an external cylindrical baking surface adapted to have dough blanks of tortilla shape sequentially deposited thereon at the top for partially baking the tortillas at one side while adhering to the baking surface during the rotation of the drum; a horizontal circular baking pan mounted directly below said baking drum for rotation about a vertical axis intersecting with said horizontal axis of the drum; means for transferring the partially baked tortillas from the baking drum to sequentially deposit them inverted onto the baking pan for baking the tortillas at the opposite side thereof; means for maintaining said baking drum and said baking pan heated to baking temperature so as to bake on said baking drum said one side of the tortillas facing the baking drum and on said baking pan said opposite side of the tortillas facing said baking pan; means for applying heat to said one side of the tortillas which are placed with said opposite side on said baking pan so that the tortillas are finally baked; and drive means for rotating said baking drum and said baking pan.

2. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of the drum; a horizontal circular baking pan mounted directly below said baking drum for rotation about a vertical axis intersecting with said horizontal axis of the drum; means for transferring the partially baked tortillas from the baking drum to sequentially deposit them inverted onto the baking pan for baking the tortillas at the opposite side thereof; means for maintaining said baking drum and said baking pan heated to baking temperature; a dough forming means associated with said baking drum for making and feeding dough blanks of tortilla shape to the top of said drum, comprising a rearward forming roller and a forward forming roller cooperating with said rearward forming roller in forming between them the tortilla blanks, said forward forming roller being disposed between said rearward forming roller and said baking drum and parallel thereto and to said rearward forming roller, a first endless transporting belt of rubber material surrounding said rearward forming roller as well as a first tensioning member located forwardly of the bottom of said forward forming roller so that said belt hugs the mutually adjoining portions of the forming rollers along a path of S-shaped configuration, a second endless transporting belt of rubbery material surrounding said forward forming roller as well as a second tensioning member located forwardly of the bottom of said forward forming roller, so that when the forming rollers are rotated the resulting tortilla blanks discharge from between said tensioning members; means for advancing said resulting blanks from said forming means to the top of said baking drum; and drive means for rotating said baking drum, said baking pan, and said tensioning members.

3. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of the drum; a horizontal circular baking pan mounted directly below said baking drum for rotation about a vertical axis intersecting with said horizontal axis of the drum; means for transferring the partially baked tortillas from the baking drum to sequentially deposit them inverted onto the baking pan for baking the tortillas at the opposite side thereof; means for maintaining said baking drum and said baking pan heated to baking temperature; a dough forming means associated with said baking drum for making and feeding dough blanks of tortilla shape to the top of said drum, comprising a rearward forming roller and a forward forming roller cooperating with said rearward forming roller in forming between them the tortilla blanks, said forward forming roller being disposed between said rearward forming roller and said baking drum and parallel thereto and to said rearward forming roller, a first endless transporting belt of rubbery material surrounding said rearward forming roller as well as a first tensioning member located forwardly of the bottom of said forward forming roller so that said belt hugs the mutually adjoining portions of the forming rollers along a path of S-shaped configuration, a second endless transporting belt of rubbery material surrounding said forward forming roller as well as a second tensioning member located forwardly of the bottom of said forming roller, so that when the forming rollers are rotated the resulting tortilla blanks discharge from between said tensioning members; an endless belt conveyer between said forming means and said baking drum arranged for depositing said resulting blanks of dough onto the top of said baking drum; and drive means for driving said baking drum, said baking pan, one of said forming rollers, and said belt conveyer.

4. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of the drum; a horizontal circular baking pan mounted directly below said baking drum for rotation about a vertical axis intersecting with said horizontal axis of the drum; means for transferring the partially baked tortillas from the baking drum to sequentially deposit them inverted onto the baking pan for baking the tortillas at the opposite side thereof; means for maintaining said baking drum and said baking pan heated to baking temperature; a dough forming means associated with said baking drum for making and feeding dough blanks of tortilla shape to the top of said drum, comprising a rearward forming roller and a forward forming roller cooperating with said rearward forming roller in forming between them the tortilla blanks, said forward forming roller being disposed between said rearward forming roller and said baking drum and parallel thereto and to said rearward forming roller, a first endless transporting belt of rubbery material surrounding said rearward forming roller as well as a first tensioning member located forwardly of the bottom of said forward forming roller so that said belt hugs the mutually adjoining portions of the forming rollers along a path of S-shaped configuration, a second endless transporting belt of rubbery material surrounding said forward forming roller as well as a second tensioning members located forwardly of the bottom of said forming roller, so that when the forming rollers are rotated the resulting tortilla blanks discharge from between said tensioning members; an endless belt conveyer between said forming means and said baking drum arranged for depositing said resulting blanks of dough onto the top of said baking drum; a rotatable receiving member for finish baked tortillas at a discharge station adjacent the periphery of said baking pan; and drive means for driving said baking drum, said baking pan, one of said forming rollers, said belt conveyer, and said rotatable receiving member.

5. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of drum; a horizontal circular baking pan; a supporting construction operatively supporting said baking pan at the periphery thereof for rotation about a vertical axis intersecting with said horizontal axis of the drum and disposed directly below said baking drum; stripping means for detaching the partially baked tortillas from the underside of the baking drum to sequentially deposit them onto the baking pan to effect baking the tortillas at the opposite side thereof; means for maintaining said baking drum and said baking pan heated to baking temperature; and drive means for rotating said baking drum and said baking pan.

6. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of drum; a horizontal circular baking pan; a rigid supporting frame work surrounding and operatively supporting said baking pan at the periphery thereof for rotation about a vertical axis intersecting with said horizontal axis of the drum and also supporting said baking drum; stripping means for detaching the partially baked tortillas from the underside of the baking drum to sequentially deposit them onto the baking pan to effect baking the tortillas at the opposite side thereof; means for maintaining said baking drum and said baking pan heated to baking temperature so as to bake on said baking drum said one side of the tortillas facing the baking drum and on said baking pan said opposite side of the tortillas facing said baking pan; means for applying heat to said one side of the tortillas which are placed with said opposite side on said baking pan so that the tortillas are finally baked; and drive means for simultaneously rotating said baking drum and said baking pan.

7. A tortilla making machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of drum; a horizontal circular baking pan having a peripheral depending skirt portion presenting a lower running edge; a rigid supporting construction for operatively supporting said baking pan at the periphery thereof for rotation about a vertical axis intersecting with said horizontal axis of the drum and also supporting said baking drum, said supporting construction including supporting roller means engaged by said lower running edge of the pan and supporting the same for rotation; stripping means for detaching the partially baked tortillas from the underside of the baking drum to sequentially deposit them onto the baking pan to effect baking the tortillas at the opposite side thereof; means for maintaining said baking drum and said baking pan heated to baking temperature so as to bake on said baking drum said one side of the tortillas facing the baking drum and on said baking pan said opposite side of the tortillas facing said baking pan; means for applying heat to said one side of the tortillas which are placed with said opposite side on said baking pan so that the tortillas are finally baked; and drive means for rotating said baking drum and said baking pan.

8. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of drum; a horizontal circular baking pan having a peripheral depending skirt portion presenting a lower running edge; a rigid supporting frame work for operatively supporting said baking pan at the periphery thereof for rotation about a vertical axis intersecting with said horizontal axis and also supporting said baking drum, said supporting frame work comprising a plurality of upright members spaced about said horizontal pan, and horizontal members rigidly interconnecting said upright members, supporting roller means mounted on said upright members and engaged by said lower running edge of the pan and supporting the same for rotation, and guide means for centering said horizontal baking pan during rotation; stripping means for detaching the partially baked tortillas from the underside of the baking drum to sequentially deposit them onto the baking pan to effect baking the tortillas at the opposite side thereof; means for maintaining said baking drum and said baking pan heated to baking temperature so as to bake on said baking drum said one side of the tortillas facing the baking drum and on said baking pan said opposite side of the tortillas facing said baking pan; means for applying heat to said one side of the tortillas which are placed with said opposite side on said baking pan so that the tortillas are finally baked; and drive means for rotating said baking drum and said baking pan.

9. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of drum; a horizontal circular baking pan; a rigid supporting construction operatively supporting said baking pan at the periphery thereof for rotation about a vertical axis intersecting with said horizontal axis and also supporting said baking drum; stripping means for detaching the partially baked tortillas from the underside of the baking drum to sequentially deposit them onto the baking pan to effect baking the tortillas at the opposite side thereof; means for maintaining said baking drum and said baking pan heated to baking temperature; means for consecutively discharging finish-baked tortillas from said baking pan; a receiving member mounted for rotation about a vertical axis arranged to receive said finish-baked tortillas at a discharge station adjacent the periphery of said baking pan; and drive means for simultaneously rotating said baking drum, said baking pan and the rotary receiving member.

10. A tortilla baking machine which comprises, in combination, a baking drum mounted for rotation about a horizontal axis and having an external cylindrical baking surface adapted to have dough blanks of tortilla shape sequentially deposited thereon at the top for partially baking the tortillas at one side while adhering to the baking surface during the rotation of the drum, said baking drum comprising a horizontal shaft, a hollow hub portion mounted on said shaft filled with heat insulating material, and a cylindrical member carried by said hub portion providing said cylindrical baking surface in concentrically spaced relationship with the hub portion and constituting therewith an annular passage for the combustion gases; a horizontal circular baking pan mounted directly below said baking drum for rotation about a vertical axis intersecting with said horizontal axis of the drum and having a central opening providing a transfer passage for combustion gases; stripping means for detaching the partially baked tortillas from the underside of the baking drum to sequentially deposit them inverted onto the baking pan to effect baking the tortillas at the opposie side thereof; means for maintaining said baking drum and said baking pan heated to baking temperature comprising fuel burner means arranged below said baking pan, producing hot combustion gases; stationary main conduit means associated with said transfer passage in the horizontal pan for conducting said combustion gases upwardly therefrom; branch conduit means extending from said main conduit means and arranged and constructed for passing combustion gases into said baking drum at one end of the annular passage therein for maintaining the baking temperature; stationary terminal conduit means associated with the opposite end of the drum for conducting spent combustion gases away from the opposite end of the drum; control means operable to vary the amount of combustion gasses passing through said main conduit means and branch conduit means respectively; and drive means for rotating said baking drum and said baking pan.

11. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of the drum, said baking drum comprising a horizontal shaft, a pair of disc members mounted on said shaft axially spaced, a cylindrical tubular member interconnecting the peripheral edges of said disc members so as to constitute therewith a hollow hub portion, and a cylindrical open ended shell carried by said hub portion providing said cylindrical baking surface in concentrically spaced relationship with the hub portion and constituting therewith an annular passage for the combustion gases; a horizontal circular baking pan mounted directly below said baking drum for rotation about a vertical axis intersecting with said horizontal axis of the drum and having a central opening providing a transfer passage for combustion gases; stripping means for detaching the partially baked tortillas from the underside of the baking drum to sequentially deposit them inverted onto the baking pan to effect baking the tortillas at the opposite side thereof; means for maintaining said baking drum and said baking pan heated to baking temperature comprising fuel burner means arranged below said baking pan, producing hot combustion gases; stationary main conduit means associated wtih said transfer passage in the horizontal pan for conducting said combustion gases upwardly therefrom; branch conduit means extending from said main conduit means and arranged and constructed for passing combustion gases into said baking drum at one end of the annular passage therein for maintaining the baking temperature; stationary terminal conduit means associated with the opposite end of the drum for conducting spent combustion gases away from the opposite end of the drum; control means operable to vary the amount of combustion gases passing through said main conduit means and branch conduit means respectively; and drive means for rotating said baking drum and said baking pan.

12. A tortilla baking machine which comprises, in combination, a baking drum opertively mounted for rotation about a horizontal axis and having an external cylindrical baking surface adapted to have dough blanks of tortilla shape sequentially deposited thereon at the top for partially baking the tortillas at one side while adhering to the baking surface during the rotation of the drum, said baking drum comprising a horizontal shaft, a pair of axially spaced disc members mounted on said shaft, a cylindrical tubular member interconnecting the peripheral edges of said disc members so as to constitute therewith a hollow hub portion, and a cylindrical open-ended shell carried by said hub portion providing said cylindrical baking surface in concentrically spaced relationship with said hub portion and constituting therewith an annular passage for the combustion gases, a quantity of heat insulating material contained in said hollow hub portion, and a heat insulating shielding means attached to the outer face of the disc member facing the stream of oncoming combustion gases; a horizontal circular baking pan mounted directly below said baking drum for rotation about a vertical axis intersecting with said horizontal axis of the drum and having a central opening providing a transfer passage for combustion gases; stripping means for detaching the partially baked tortillas from the underside of the baking drum to sequentially deposit them inverted onto the baking pan to effect baking the tortillas at the opposite side thereof; means for maintaining said baking drum and said baking pan heated to baking temperature comprising fuel burner means arranged below said baking pan, producing hot combustion gases; stationary conduit means associated with said transfer passage in the horizontal pan for conducting said combustion gases upwardly therefrom; branch conduit means extending from said main conduit means and arranged and constructed for passing combustion gases into said baking drum at one end of the annular passage therein for maintaining the baking temperature; stationary terminal conduit means associated with the opposite end of the drum for conducting spent combustion gases away from the opposite end of the drum; control means operable to vary the amount of combustion gases passing through said main conduit means and branch conduit means respectively; and drive means for simultaneously rotating said baking drum and said baking pan in coordination to one another.

13. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of the drum; a horizontal circular baking pan mounted directly below said baking drum for rotation about a vertical axis intersecting with said horizontal axis of the drum and having a central opening providing a transfer passage for combustion gases; stripping means for detaching the partially baked tortillas from the underside of the baking drum to sequentially deposit them inverted onto the baking pan to effect baking the tortillas at the opposite side thereof; means for maintaining said baking drum and said baking pan heated to baking temperature comprising fuel burner means arranged below said baking pan, producing hot combustion gases; stationary main conduit means associated with said transfer passage for conducting said combustion gases upwardly therefrom; a first branch conduit extending from said main conduit means and communicating with the interior of said baking drum for passing combustion gases into said baking drum at one end thereof for maintaining the baking temperature; a secondary branch conduit leading from said first branch conduit downwardly into the vicinity of baking pan to apply final heating from the top to the tortillas on the pan; stationary terminal conduit means associated with the opposite end of the drum for conducting spent combustion gases away from the opposite end of the drum; control means operable to vary the amount of combustion gases passing through said main conduit means and the respective branch conduits; and drive means for rotating said baking drum and said baking pan.

14. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during the rotation of the drum; a horizontal circular baking pan having a central opening providing a transfer passage for combustion gases and having a peripheral depending skirt portion; a supporting construction operatively supporting said baking pan at the periphery thereof for rotation about a vertical axis intersecting with said horizontal axis of the drum and also supporting said baking drum; stripping means for detaching the partially baked tortillas from the underside of the baking drum to sequentially deposit them inverted onto the baking pan to effect baking the tortillas at the opposite side thereof; means for maintaining said baking drum and said baking pan heated to baking temperature comprising fuel burner means arranged below said baking pan, producing hot combustion gases; stationary main conduit means associated with said transfer passage in the horizontal pan for conducting said combustion gases upwardly therefrom; branch conduit means extending from said main conduit means and communicating with the interior of said baking drum for passing combustion gases into said baking drum at one end thereof for maintaining the baking temperature; stationary terminal conduit means associated with the opposite end of the drum for conducting spent combustion gases away from the opposite end of the drum; control means operable to vary the amount of combustion gases passing through said main conduit means and branch conduit means respectively; and drive means for simultaneously rotating said baking drum and said baking pan in coordination to one another.

15. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during rotation of the drum; a horizontal circular baking pan mounted directly below said baking drum for rotation about a vertical axis intersecting with said horizontal axis of the drum and having a central opening providing a transfer passage for combustion gases; stripping means for detaching the partially baked tortillas from the underside of the baking drum to sequentially deposit them inverted onto the baking pan to effect baking the tortillas at the opposite side thereof; means for maintaining said baking drum and said baking pan heated to baking temperature comprising fuel burner means arranged below said baking pan producing the combustion gases; stationary main stack having an outwardly flaring lower open end portion over said transfer passage for conducting said combustion gases; branch conduit means extending from said main stack and communicating with the interior of said baking drum for passing at least a portion of the combustion gases into said drum at one end thereof for maintaining the baking temperature; terminal conduit means comprising a second stack associated with the opposite end of the drum for conducting spent combustion gases away from the drum; damper means in each stack operable between open and closed position; actuating means for said damper means so arranged and constructed that moving one of the damper means towards closing will move the other damper means towards opening; and drive means for simultaneously rotating said baking drum and said baking pan.

16. A tortilla baking machine which comprises, in combination, a baking drum operatively mounted for rotation about a horizontal axis and having an external cylindrical baking surface adapted to have dough blanks of tortilla shape sequentially deposited thereon at the top for partially baking the tortillas at one side while adhering to the baking surface during rotation of the drum; a horizontal circular baking pan mounted directly below said baking drum for rotation about a vertical axis intersecting with said horizontal axis of the drum and having a central opening providing a transfer passage for combustion gases; stripping means for detaching the partially baked tortillas from the underside of the baking drum to sequentially deposit them inverted onto the baking pan to effect baking the tortillas at the opposite side thereof; means for maintaining said baking drum and said baking pan heated to baking temperature comprising fuel burner means arranged below said baking pan producing the combustion gases; a stationary main stack having an outwardly flaring lower open end portion over said transfer passage for conducting said combustion gases; branch conduit means extending from said main stack and communicating with the interior of said baking drum for passing at least a portion of the combustion gases into said drum at one end thereof for maintaining the baking temperature; terminal conduit means comprising a second stack associated with the opposite end of the drum for conducting spent combustion gases away from the drum; a control arrangement for proportioning the flow of combustion gases through said stacks, comprising a horizontal damper rod extending through both stacks, a main damper plate mounted on said rod in said main stack, a second damper plate mounted in said second stack angularly displaced with respect to said main damper plate in such a manner that rotation of said damper rod will move one of said damper plates towards closing while moving the other damper plate towards opening; and drive means for simultaneously rotating said baking drum and said baking pan.

References Cited in the file of this patent

UNITED STATES PATENTS

| | | |
|---|---|---|
| 1,064,345 | Knipe | June. 10, 1913 |
| 2,861,524 | Peralta | Nov. 25, 1958 |